(12) United States Patent
Hui et al.

(10) Patent No.: US 12,490,167 B2
(45) Date of Patent: Dec. 2, 2025

(54) DYNAMIC NETWORK SLICING RESOURCE RESELECTION

(71) Applicant: QUALCOMM Incorporated, San Diego, CA (US)

(72) Inventors: Chaofeng Hui, Beijing (CN); Yuankun Zhu, Shanghai (CN); Fojian Zhang, Shenzhen (CN); Hao Zhang, Shanghai (CN); Yi Liu, Shenzhen (CN)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 18/006,530

(22) PCT Filed: Sep. 30, 2020

(86) PCT No.: PCT/CN2020/119442
§ 371 (c)(1),
(2) Date: Jan. 23, 2023

(87) PCT Pub. No.: WO2022/067684
PCT Pub. Date: Apr. 7, 2022

(65) Prior Publication Data
US 2023/0276337 A1 Aug. 31, 2023

(51) Int. Cl.
*H04W 40/02* (2009.01)
*H04W 48/18* (2009.01)

(52) U.S. Cl.
CPC .......... *H04W 40/02* (2013.01); *H04W 48/18* (2013.01)

(58) Field of Classification Search
CPC . H04W 40/02; H04W 48/18; H04W 28/0268; H04W 40/24; H04W 36/12; H04W 76/22; H04W 88/02; H04L 45/851; H04L 67/141; Y02D 30/70
See application file for complete search history.

(56) References Cited

U.S. PATENT DOCUMENTS

2018/0324577 A1* 11/2018 Faccin ................. H04W 76/27
2020/0187085 A1 6/2020 Jagannatha et al.
(Continued)

FOREIGN PATENT DOCUMENTS

CN 110519824 A 11/2019
CN 111034268 A 4/2020
(Continued)

OTHER PUBLICATIONS

International Search Report and Written Opinion—PCT/CN2020/119442—ISA/EPO—Jun. 30, 2021.
(Continued)

*Primary Examiner* — Afshawn M Towfighi
(74) *Attorney, Agent, or Firm* — NORTON ROSE FULBRIGHT US LLP

(57) ABSTRACT

Systems and methods for providing dynamic network slicing resource reselection for wireless communication are described. User equipments (UEs) may determine that network slicing resources utilized with respect to one or more applications are to be changed in run time, such as for more efficient operation in light of a change in power mode, throughput mode, latency mode, etc. A message indicating a cause for reselection of a current packet data unit (PDU) session association with an application may be provided to a UE route selection policy (URSP) manager. The URSP manager may reevaluate a current PDU session association with the application to determine if it is a best match with the cause. If no, a switch to a new PDU session association with the application may be made. If yes, the current PDU session association with the application may be maintained Other aspects and features are also claimed and described.

15 Claims, 8 Drawing Sheets

(56) References Cited

U.S. PATENT DOCUMENTS

2021/0211938 A1\* 7/2021 Shen ............... H04W 28/0925
2023/0081061 A1\* 3/2023 Yang ............... H04L 43/0876
                                                         455/414.1

FOREIGN PATENT DOCUMENTS

| CN | 111095984 A | 5/2020 |
|----|-------------|--------|
| WO | WO-2018034924 A1 | 2/2018 |
| WO | WO-2019174115 A1 | 9/2019 |

OTHER PUBLICATIONS

Nokia, et al., "Update to UE Procedure for Associating Applications to PDU Sessions Based on URSP", 3GPP Draft, SA WG2 Meeting #127bis, S2-185129, May 28-Jun. 1, 2018, Newport Beach, USA, 8 Pages.

Intel: "Clarification on URSP Rule and UE Local Configuration Association", S2-1810540, (Revision of S2-181xxxx), 3GPP TSG-SA WG2 Meeting #129, 23.503 CR Clarification On URSP Rule Association V2, 3rd Generation Partnership Project, Mobile Competence Centre, 650, Route Des Lucioles, F-06921 Sophia-Antipolis CED vol. SA WG2, No. Dongguan, China, Oct. 15, 2018-Oct. 19, 2018, Oct. 9, 2018, XP051539513, 3rd page, 4 Pages, section 6.6.2.3.

Supplementary European Search Report—EP20955709—Search Authority—The Hague—Apr. 24, 2024.

\* cited by examiner

URSP policy Structure

| Traffic Descriptors | DNN=Internet |
| --- | --- |
| Route Selection Descrpptors | RSD1: S-NSSAI= eMBB<br>RSD2: S-NSSAI= URLLC<br>RSD3: S-NSSAI= IOT<br>RSD4: S-NSSAI=XXX |

FIG. 4

DYNAMIC NETWORK SLICING RESOURCE RESELECTION

CROSS-REFERENCE TO RELATED APPLICATIONS

[0000.1] This application claims the benefit of International Patent Application No. PCT/CN2020/119442, entitled, "DYNAMIC NETWORK SLICING RESOURCE RESELECTION", filed on Sep. 30, 2020, which is expressly incorporated by reference herein in its entirety.

TECHNICAL FIELD

Aspects of the present disclosure relate generally to wireless communication systems, and more particularly, to network slicing. Certain embodiments of the technology discussed below can enable and provide dynamic network slicing resource reselection.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station. A base station may transmit data and control information on the downlink to a UE and/or may receive data and control information on the uplink from the UE.

On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink. As the demand for mobile broadband access continues to increase, the possibilities of interference and congested networks grows with more UEs accessing the long-range wireless communication networks and more short-range wireless systems being deployed in communities.

Network architectures for supporting a variety of services with very different service level requirements (SLR) have been developed. For example, network slicing is a network architecture that enables the multiplexing of virtualized and independent logical networks on the same physical network infrastructure. Each network slice is an isolated end-to-end network configured or selected to fulfil requirements of a particular application. A network operator who deploys a standalone access (SA) network employing network slicing may administer each network slice, such as through the use of UE route selection policies (URSPs). In implementing network slicing, a UE invokes a procedure for associating applications to packet data unit (PDU) sessions based on URSP policy. Thereafter, the UE routes applications to a respective slicing resource pool (e.g., PDU session) based on URSP policy. In routing applications to a slicing resource pool, the UE selects the higher precedence route selection descriptor (RSD) for PDU session association.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. A method may include operating according to a user equipment (UE) route selection policy (URSP) configuration to associate one or more applications to packet data unit (PDU) sessions of network slicing operation. A method may also include providing a message to a URSP manager indicating a cause for dynamic reselection of a current PDU session association with a first application of the one or more applications. A method may further include switching to a new PDU session association with the first application in response to an indication from the URSP manager for reselection of the new PDU session based on the cause for dynamic reselection or keeping the current PDU session association with the first application in response to no indication from the URSP manager for reselection of the new PDU session based on the cause for dynamic reselection.

In an additional aspect of the disclosure, an apparatus for wireless communication is provided. An apparatus may include means for operating according to a URSP configuration to associate one or more applications to PDU sessions of network slicing operation. An apparatus may also include providing a message to a URSP manager indicating a cause for dynamic reselection of a current PDU session association with a first application of the one or more applications. An apparatus may further include switching to a new PDU session association with the first application in response to an indication from the URSP manager for reselection of the new PDU session based on the cause for dynamic reselection or keeping the current PDU session association with the first application in response to no indication from the URSP manager for reselection of the new PDU session based on the cause for dynamic reselection.

In an additional aspect of the disclosure, a non-transitory computer-readable medium having program code recorded thereon for wireless communication is provided. Program code may include code to operate according to a URSP configuration to associate one or more applications to PDU sessions of network slicing operation. Program code may also include code to provide a message to a URSP manager indicating a cause for dynamic reselection of a current PDU session association with a first application of the one or more applications. Program code may further include code to switch to a new PDU session association with the first application in response to an indication from the URSP manager for reselection of the new PDU session based on the cause for dynamic reselection or keeping the current PDU session association with the first application in response to no indication from the URSP manager for reselection of the new PDU session based on the cause for dynamic reselection.

In an additional aspect of the disclosure, an apparatus configured for wireless communication is provided. The apparatus includes at least one processor, and a memory coupled to the processor. The processor may be configured to operate according to a URSP configuration to associate one or more applications to PDU sessions of network slicing operation. The processor may also be configured to provide a message to a URSP manager indicating a cause for dynamic reselection of a current PDU session association with a first application of the one or more applications. The processor may further be configured to switch to a new PDU session association with the first application in response to an indication from the URSP manager for reselection of the new PDU session based on the cause for dynamic reselection or keeping the current PDU session association with the first application in response to no indication from the URSP manager for reselection of the new PDU session based on the cause for dynamic reselection.

In accordance with aspects of the disclosure, the foregoing systems, methods, and apparatuses may be implemented in combination with one or more additional features, such as the following features whether alone or in combination. For example, the above systems, methods, and apparatuses may include an indication of the cause for dynamic reselection of the current PDU session association with the first application being provided by the first application. The above systems, methods, and apparatuses may include obtaining performance dimension information for slicings of the URSP configuration, and augmenting route selection policy information of the URSP configuration to include performance dimension criteria based on the performance dimension information. The above systems, methods, and apparatuses may include the performance dimension information including information selected from the group consisting of bandwidth information, latency information, power consumption information, and economy mode information with respect to slicings of the URSP configuration. The above systems, methods, and apparatuses may include applying the URSP configuration on boot up of the UE to associate the one or more applications to the PDU sessions, and applying an augmented URSP configuration to dynamically reselect PDU session association with the first application after the augmenting the URSP configuration. The above systems, methods, and apparatuses may include the cause for dynamic reselection of the current PDU session association with the first application indicated in the message to the URSP manager corresponding to a performance dimension and being selected from the group consisting of low power mode operation with respect to the first application, high power mode operation with respect to the first application, low latency mode operation with respect to the first application, high latency mode operation with respect to the first application, low throughput mode operation with respect to the first application, high throughput mode operation with respect to the first application, low economic mode operation with respect to the first application, and high economic mode operation with respect to the first application. The above systems, methods, and apparatuses may include the indication from the URSP manager for reselection of the new PDU session including fully matched single network slice selection assistance information (S-NSSAI) for the first application. The above systems, methods, and apparatuses may include the indication from the URSP manager for reselection of the new PDU session being based on the URSP manager reevaluating the current PDU session association with the first application with respect to the new PDU session association with the first application in view of the cause for dynamic reselection.

In one aspect of the disclosure, a method of wireless communication is provided. A method may include obtaining, by a URSP manager, a message indicating a cause for dynamic reselection of a current PDU session association with a first application of one or more applications. A method may also include determining, by the URSP manager, whether to provide an indication of a new PDU session association with the first application based on reevaluating the current PDU session association with the first application and a new PDU session association with the first application in light of the cause for dynamic reselection.

In an additional aspect of the disclosure, an apparatus for wireless communication is provided. An apparatus may include means for obtaining, by a URSP manager, a message indicating a cause for dynamic reselection of a current PDU session association with a first application of one or more applications. An apparatus may also include means for determining, by the URSP manager, whether to provide an indication of a new PDU session association with the first application based on reevaluating the current PDU session association with the first application and a new PDU session association with the first application in light of the cause for dynamic reselection.

In an additional aspect of the disclosure, a non-transitory computer-readable medium having program code recorded thereon for wireless communication is provided. Program code may include code to obtain, by a URSP manager, a message indicating a cause for dynamic reselection of a current PDU session association with a first application of one or more applications. Program code may also include code to determine, by the URSP manager, whether to provide an indication of a new PDU session association with the first application based on reevaluating the current PDU session association with the first application and a new PDU session association with the first application in light of the cause for dynamic reselection.

In an additional aspect of the disclosure, an apparatus configured for wireless communication is provided. The apparatus includes at least one processor, and a memory coupled to the processor. The processor may be configured to obtain, by a URSP manager, a message indicating a cause for dynamic reselection of a PDU session association with a first application of one or more applications. The processor may also be configured to determine, by the URSP manager, whether to provide an indication of a new PDU session association with the first application based on reevaluating the current PDU session association with the first application and a new PDU session association with the first application in light of the cause for dynamic reselection.

In accordance with aspects of the disclosure, the foregoing systems, methods, and apparatuses may be implemented in combination with one or more additional features, such as the following features whether alone or in combination. For example, the above systems, methods, and apparatuses may include an indication of the cause for dynamic resection of the current PDU session association with the first application being provided by the first application. The above systems, methods, and apparatuses may include a URSP configuration having route selection policy information augmented to include performance dimension criteria corresponding to the cause for dynamic reselection of the current PDU session, and a determination to provide the indication of the new PDU session association with the first application being based at least in part on the cause for dynamic reselection matching performance dimension criterial of the route selection policy information. The above systems, methods, and apparatuses may include the performance dimension criteria corresponding to information selected from the group consisting of bandwidth information, latency information, power consumption information, and economy mode information with respect to slicings of the URSP configuration. The above systems, methods, and apparatuses may include the cause for dynamic reselection of the current PDU session association with the first application indicated in the message obtained by the URSP manager corresponding to the performance dimension criteria and being selected from the group consisting of low power mode operation with respect to the first application, high power mode operation with respect to the first application, low latency mode operation with respect to the first application, high latency mode operation with respect to the first application, low throughput mode operation with respect to the first application, high throughput mode operation with respect to the first application, low economic mode operation with respect to the first application, and high economic mode operation with respect to the first application. The above systems, methods, and apparatuses may include the indication from the URSP manager for reselection of the new PDU session including fully matched S-NSSAI for the first application. The above systems, methods, and apparatuses may include the indication from the URSP manager for reselection of the new PDU session being based on the URSP manager reevaluating the current PDU session association with the first application with respect to the new PDU session association with the first application in view of the cause for dynamic reselection.

Other aspects, features, and embodiments will become apparent to those of ordinary skill in the art, upon reviewing the following description of specific, exemplary embodiments in conjunction with the accompanying figures. While features may be discussed relative to certain aspects and figures below, all embodiments can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 4 is an example of a user equipment route selection policy (URSP) structure according to some embodiments of the present disclosure.

DETAILED DESCRIPTION

Figure 1:
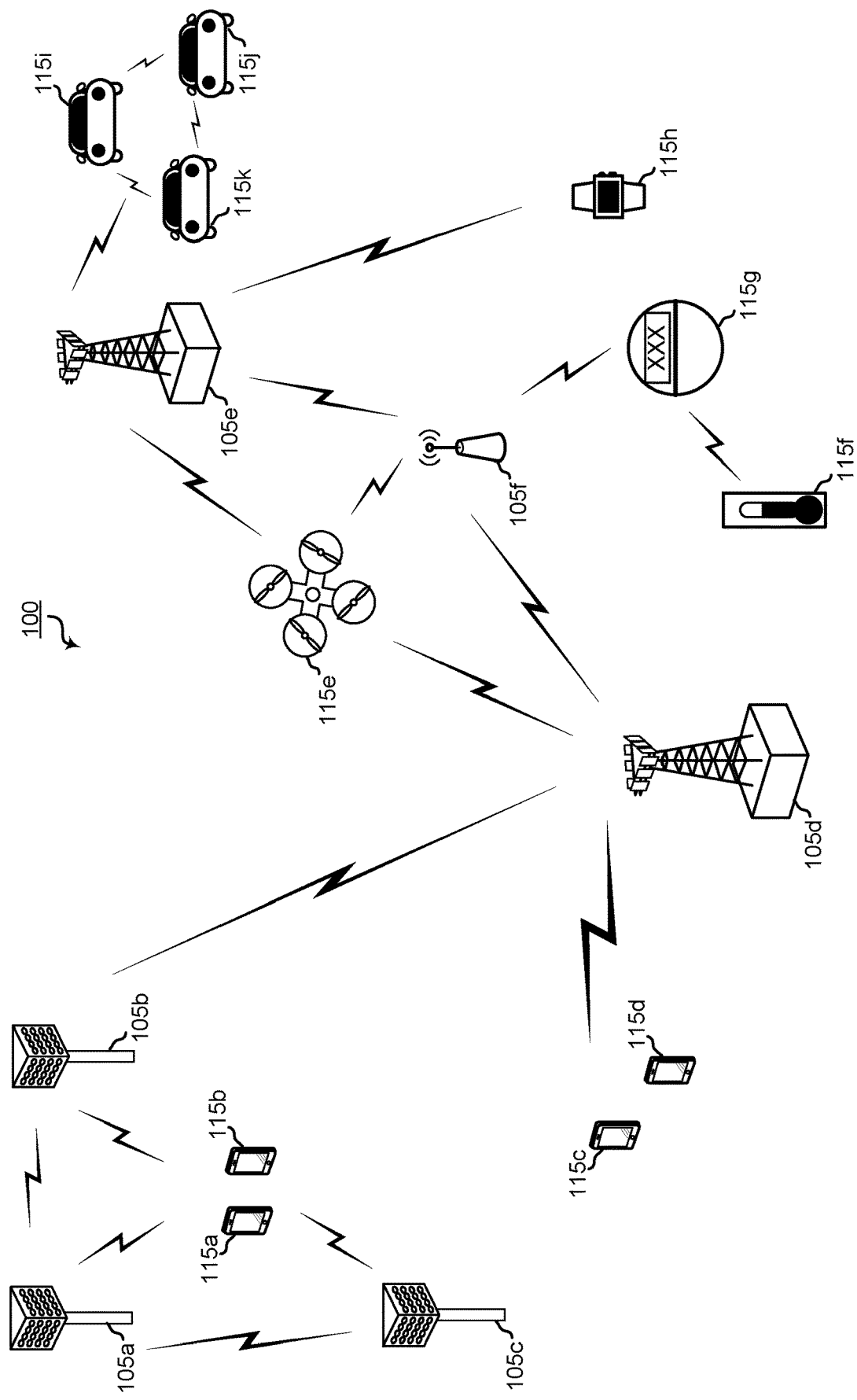
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3$^{rd}$ Generation Partnership Project" (3GPP), and cdma2000 is described in documents from an organization named "3$^{rd}$ Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects descried with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of Things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of Things" (IoT) or "Internet of Everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
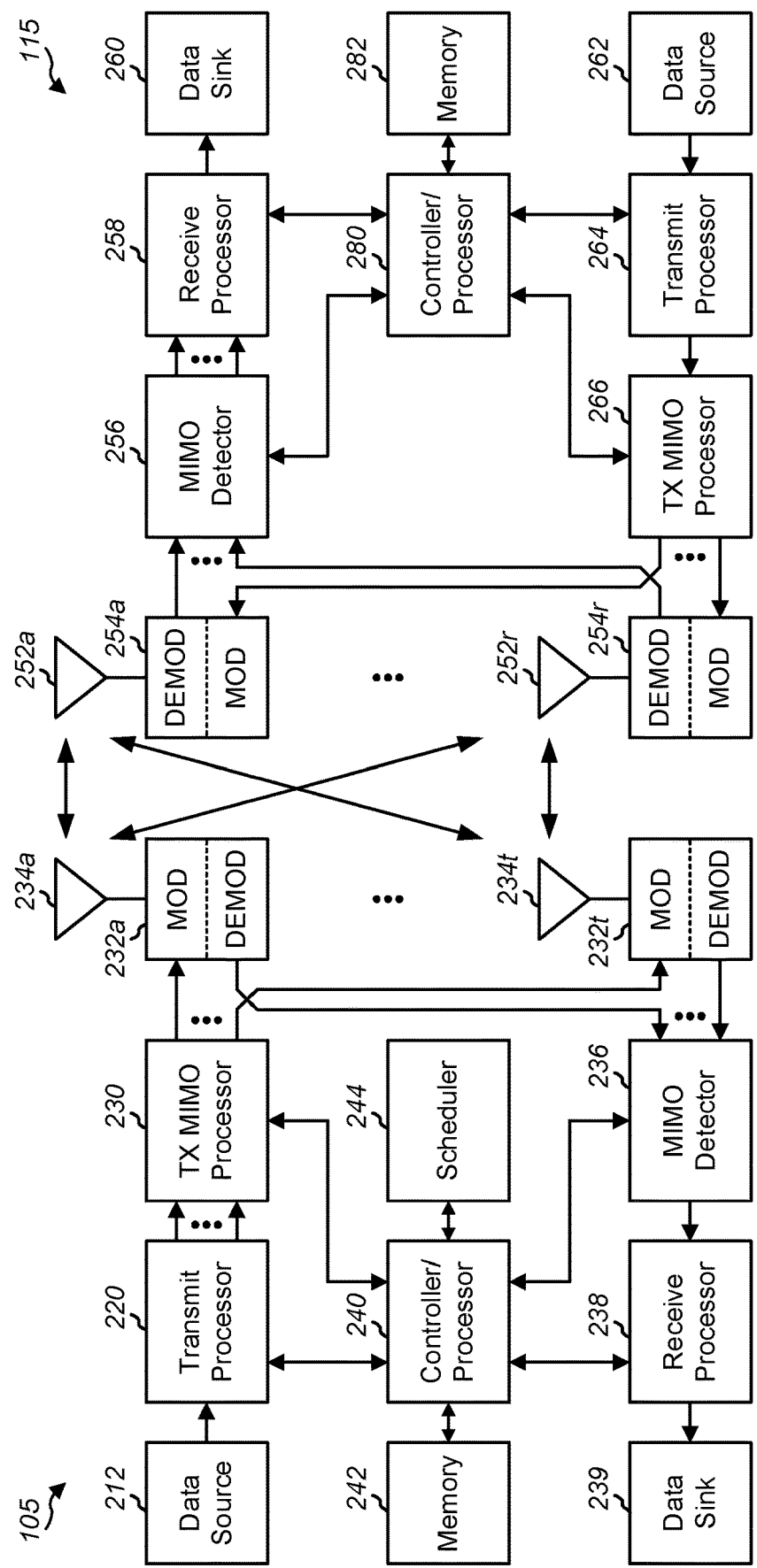
FIG. 2 is a block diagram conceptually illustrating a design of a base station and a UE configured according to some embodiments of the present disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 5-8, and/or other processes for the techniques described herein. Memories 242 and 282 may store data and program codes for base station 105 and UE 115, respectively. Scheduler 244 may schedule UEs for data transmission on the downlink and/or uplink.

Figure 3:
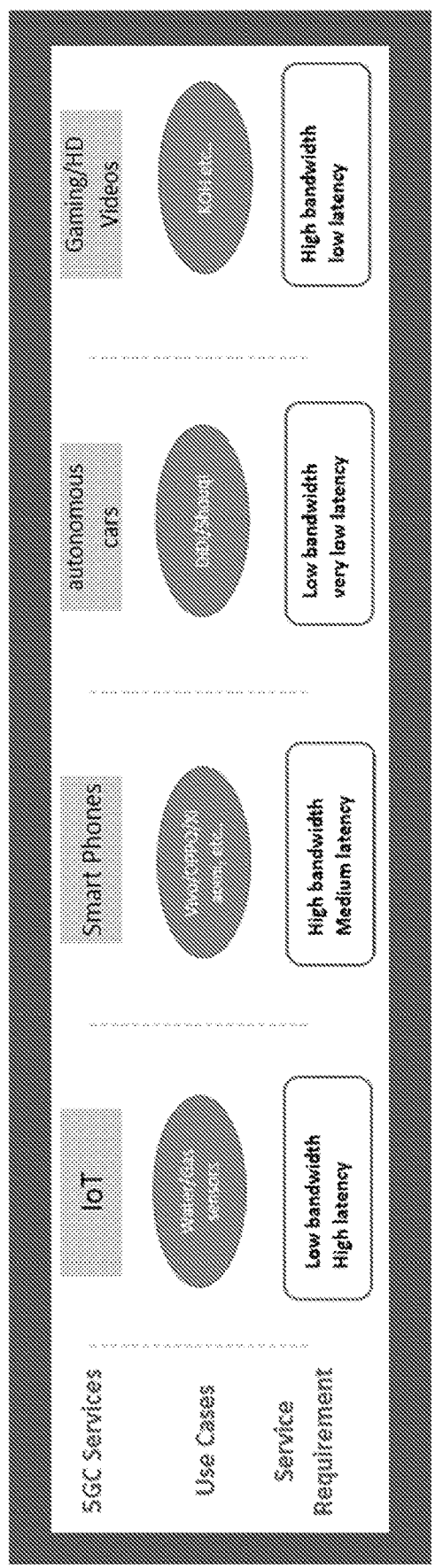
FIG. 3 illustrates different scenarios having different service level requirements (SLRs) according to some embodiments of the present disclosure.

In accordance with aspects of the present disclosure, devices of wireless network 100 may implement network slicing to provide isolated resources for different scenarios, such as for IoT applications, enhanced mobile broadband (eMBB) applications, applications relying on ultra-reliable low-latency communication (URLLC), etc. As shown in FIG. 3, different scenarios may have different service level requirements (SLRs). For example, the applications executed by various devices may have different bandwidth, latency, power consumption, economic, etc. needs. Additionally or alternatively, individual devices may execute applications having different bandwidth, latency, power consumption, economic, etc. needs. Network slicing as implemented by base stations 105 and UE 115 may enable the multiplexing of virtualized and independent logical networks on the same physical network infrastructure for supporting services with different SLRs. Using network slicing, different devices may subscribe for different network slicing instances and/or a same device may subscribe for different network slicing instances for different applications.

A UE may associate applications to packet data unit (PDU) sessions based on a UE route selection policy (URSP). A URSP is a set of one or more URSP rules, where a URSP rule is composed of a precedence value of the URSP rule identifying the precedence of the URSP rule among all the existing URSP rules, one or more traffic descriptors, and one or more route selection descriptors (RSDs) for each of the one or more traffic descriptors. An example of a URSP structure is shown in FIG. 4. UEs may utilize a URSP manager (e.g., URSP manager logic stored by memory 282 and executed by controller/processor 280) to associate applications executed by the UE (e.g., applications, such as games, media players, communications, health monitoring, IoT operation, automated vehicle control, etc., as may be executed in an operating system (OS)) with PDU sessions in accordance with a URSP.

Using network slicing, a UE routes applications to different slicing resource pools based on a URSP. An application may have several matched RSDs. In this situation, UE is to pick the highest precedence RSD (e.g., the first or highest level RSD in a list of RSDs for a traffic description matching the application in the URSP) for PDU session association. Associating an application with the PDU session of the highest precedence RSD in the case of a plurality of matched RSDs for that application is not a flexible procedure when network provides different types of single network slice selection assistance information (S-NSSAI) for an application or a data network name (DNN). That is, a UE has no option for choosing a wanted slicing, but instead follows the URSP which always provides a higher precedence slicing.

Figure 5:
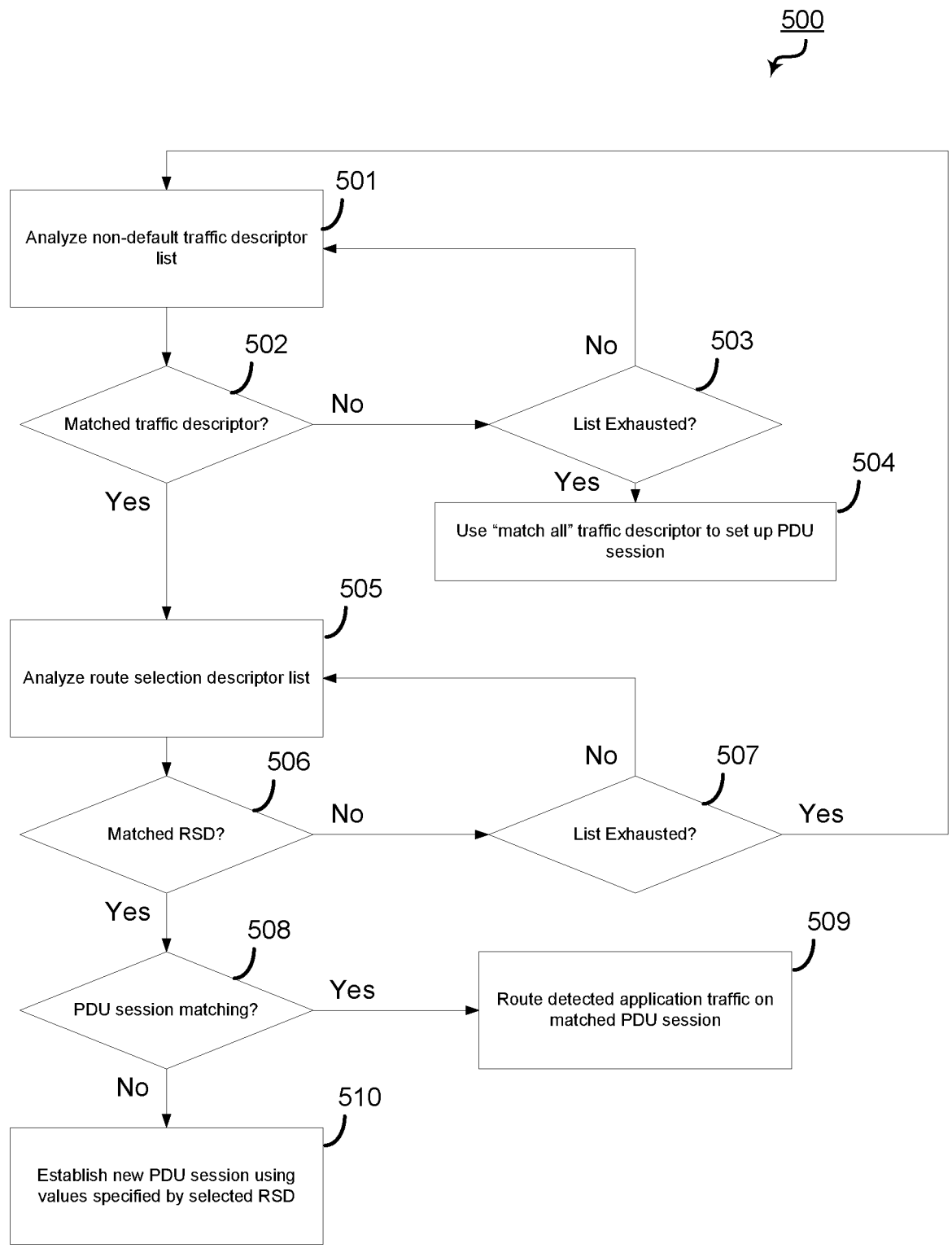
FIG. 5 is a block diagram of a flow for associating applications to PDU sessions based on a URSP according to some embodiments of the present disclosure.

FIG. 5 shows flow 500 illustrating an example procedure by which a UE associates applications to PDU sessions based on a URSP. Flow 500 may, for example, be implemented by a URSP manager of UE 115 using a URSP configured to the UE.

At block 501 the UE analyzes a non-default traffic descriptor in a list of traffic descriptors of the URSP and, at block 502, and determines if the non-default traffic descriptor is a matched traffic descriptor for an application for which network slicing is to be implemented. For example, the traffic descriptors may comprise one or more application identifiers, one or more IP 3 tuples (e.g., destination IP address, destination port number, and protocol in use above the IP), one or more non-IP descriptors (e.g., destination information of non-IP traffic), one or more DNNs, one or more connection capabilities, and/or one or more domain descriptors (e.g., destination fully qualified domain names (FQDNs)), whereby matching of the application and a traffic descriptor with respect to this information may identify the traffic descriptor as matching the application. If the non-default traffic descriptor is not determined to be a matching traffic descriptor for the application at block 502, processing according to the illustrated example of flow 500 proceeds to block 503 for a determination regarding whether the traffic descriptor list of the URSP has been exhausted. If the traffic descriptor list has not been exhausted (e.g., all non-default traffic descriptors of the traffic descriptor list have not been analyzed with respect to the application), processing according to flow 500 returns to block 501 to continue analyzing the non-default traffic descriptors (e.g., analyzing a next non-default traffic descriptor in the traffic descriptor list). However, if the traffic descriptor list is determined to have been exhausted at block 503 (e.g., all non-default traffic descriptors of the traffic descriptor list have been analyzed with respect to the application), processing according to the example of flow 500 proceeds to block 504 wherein a "match all" traffic descriptor is used to set up a PDU session for the application. In the case that there is not a matching URSP rule and no default "match all" traffic descriptor is configured, then the UE is unable to request a network slicing connection with respect to the application.

If a non-default traffic descriptor is determined to be a matching traffic descriptor for the application at block 502, processing according to the example of flow 500 proceeds to block 505 where the UE analyzes a RSD in a list of RSDs of the matching non-default traffic descriptor and, at block 506, and determines if the RSD is a matched RSD for the application. For example, the RSDs may comprise a session and service continuity (SSC) mode, one or more S-NSSAIs, one or more DNNs, a preferred access type, a multi-access preference, a time window, and/or location criteria, whereby matching of the application and a RSD with respect to this information may identify the RSD as matching the application. If a matching RSD for the application is not identified at block 506, processing according to the example of flow 500 proceeds to block 507 for a determination regarding whether the RSD list for the matching non-default traffic descriptor has been exhausted. If the RSD list has not been exhausted (e.g., all RSDs of the RSD list have not been analyzed with respect to the application), processing according to flow 500 returns to block 505 to continue analyzing the RSDs (e.g., analyzing a next RSD in the RSD list). However, if the RSD list is determined to have been exhausted at block 507 (e.g., all RSDs of the RSD list have been analyzed with respect to the application), processing according to the example of flow 500 returns to block 501 to continue analyzing the non-default traffic descriptors (e.g., analyzing a next non-default traffic descriptor in the traffic descriptor list). That is, if the RSD list is exhausted, the UE will attempt to identify a next matched traffic descriptor for the application.

If a RSD is determined to be a matching RSD for the application at block 506, processing according to the example of flow 500 proceeds to block 508 where the UE determines if a PDU session of the matching RSD is a matching PDU session for the application. For example, the RSDs may comprise a PDU session type, whereby matching of the application with the PDU session type may identify the PDU session as matching the application. If a matching PDU session is identified at block 508, processing according to the example of flow 500 proceeds to block 509 wherein application traffic detected with respect to the application is routed on the matched PDU session. However, if a matching PDU session is not identified at block 508, processing according to the example of flow 500 proceeds to block 510 wherein a new PDU session is established using values specified by the matching RSD.

In accordance with aspects of the disclosure, applications (e.g., various applications executing in the UE OS) are enabled to dynamically, or on demand, change their slicing pool (e.g., reselect a PDU session) in run time. Reselection of a slicing utilized with respect to an application may be desired to accommodate various operational or state changes in the UE and/or applications, such as a change in low/high power mode operation, low/high latency mode operation, low/high throughput mode operation, low/high economic mode operation, etc. For example, a UE may determine that it (e.g., the UE is transitioning from a wake state to a between a sleep state) and/or an application executed by the UE (e.g., an application is transitioning from an active interface state to a minimized state) is to switch from a high power mode to a low power mode, and thus a low power consumption slicing (e.g., using a lower bandwidth configuration, infrequent scheduling, longer connected mode discontinuous reception (cDRX) cycle, etc.) may be desired. As another example, a UE may determine that a switch from high throughput slicing to a low throughput but low latency slicing (e.g., using wider subcarrier spacing (SCS), frequent scheduling, lower bandwidth, etc.) is desired (e.g., an application transfers from video communication operation to voice communication operation). As yet another example, a UE may determine that a switch from a high economic cost slicing to a low economic cost slicing (e.g., using lower cost network resources) is desired (e.g., the UE and/or an application transfers from a day mode state to a night mode state). It can be appreciated from the foregoing, that in particular situations a UE may determine that a switch from a first slicing (e.g., association of one or more applications with a current slicing resource pool or current PDU session) to a second slicing (e.g., association of the one or more applications with a new slicing resource pool or new PDU session) for a particular purpose.

A UE may be configured with a URSP used with respect to network slicing by an operator with which the UE is subscribed. Accordingly, UE 115 may utilize such a preconfigured URSP in applying an initial network slicing configuration to associate the one or more applications to the PDU sessions, such as on boot up of the UE. The network slicing provided by such preconfigured URSPs may thus be known and studied with respect to various performance dimensions (e.g., bandwidth, latency, power consumption, economic, etc.).

In accordance with some aspects of the disclosure, UE 115 may be configured with information regarding a capacity or ranking of each slicing of a URSP with respect to performance dimensions (e.g., capacity/ranking information regarding bandwidth, latency, power consumption, economic, etc.). For example, UEs may utilize a slicing reselection manager (e.g., slicing reselection manager logic stored by memory 282 and executed by controller/processor 280) to analyze each slicing's capacity and/or other operational aspects to determine performance dimensions for the slicings. Additionally or alternatively, a network operator administering the network slicing may provide information regarding a capacity or ranking of each slicing of a URSP with respect to performance dimensions to UEs. UEs may utilize a slicing reselection manager (e.g., slicing reselection manager logic stored by memory 282 and executed by controller/processor 280) to augment RSDs of a URSP to include performance dimension criteria based on the information regarding a capacity or ranking of each slicing of a URSP with respect to performance dimensions provided to the UE. As an example, the RSDs shown in the example of FIG. 4 may be augmented with performance dimension criteria for bandwidth, latency, power consumption, and economic performance dimensions as shown below:

RSD1: S-NSSAI=eMBB; LATENCY=LOW; TPUT=HIGH; PWR_CON=HIGH; ECON=HIGH

RSD2: S-NSSAI=URLLC; LATENCY=U-LOW; TPUT=HIGH; PWR_CON=HIGH; ECON=HIGH

RSD3: S-NSSAI=IOT; LATENCY=HIGH; TPUT=LOW; PWR_CON=LOW; ECON=LOW

RSD4: S-NSSAI=XXX; LATENCY=LLL; TPUT=TTT; PWR_CON=PPP; ECON=EEE

Using RSDs augmented with performance dimension criteria, a URSP manager may use information regarding a cause for reselecting a PDU session with respect to one or more applications to analyze (e.g., reevaluate) a current PDU session associated with the one or more applications to determine if it is a best match in light of the cause for reselection, or if a new PDU session is a better match in light of the cause for reselection. For example, information regarding a cause for reselecting a PDU session may indicate that the one or more applications are transitioning to low or high power mode operation, low or high latency mode operation, low or high throughput mode operation, low or high economic mode operation, etc., or combinations thereof. Such information for the one or more applications may be provided to the URSP manager in a form corresponding to the performance dimension criteria of the augmented RSDs for use in analyzing RSDs for determining if a RSD is a matched RSD for the application based on performance dimension criteria. Logic of a slicing reselection manager of aspects of the disclosure may, for example, provide a message to the URSP manager indicating a cause for dynamic reselection of a current PDU session association with one or more applications, such as upon determining that an operational or state change in the UE and/or one or more applications relevant to network slicing is, or will be, implemented. On receiving the indication, the URSP manager may reevaluate the current PDU session (e.g., perform the functions of flow 500) for determining if a new PDU session is selected based on the cause for dynamic reselection. A new PDU session may, for example, be selected when an augmented RSD of a matching non-default traffic descriptor of the URSP fully matches the application (e.g., at block 506 of flow 500), including the cause(s) for dynamic reselection matching performance dimension criteria of the augmented RSD. That is, the URSP manager may operate to change the PDU session association with one or more applications to a new PDU session of a RSD having a fully matched S-NSSAI. Otherwise, the PDU session association may not be changed in light of the reevaluation by the URSP manager.

Dynamic network slicing resource reselection, such as may be implemented in accordance with the foregoing example, facilitates flexibility with respect to a UE selecting network slicing resources based upon one or more cause relevant to the operation of the UE and/or application(s). Moreover, UE operation in an economic mode is facilitated by dynamic network slicing resource reselection according to some aspects of the present disclosure.

Figures 6, 7:
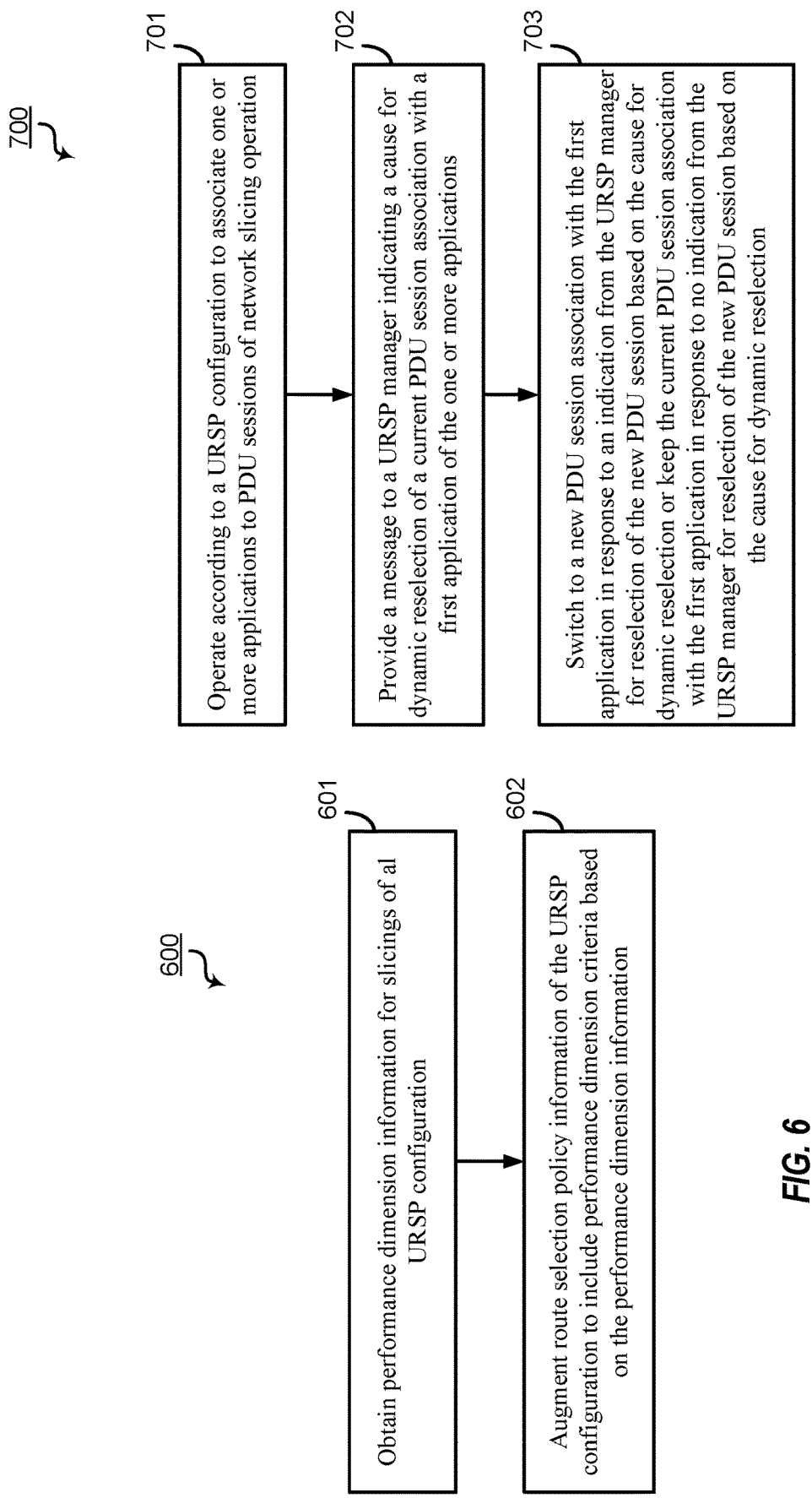
FIG. 6 is block diagram of a flow for configuring a URSP for use in dynamically changing slicing pools associated with applications according to some embodiments of the present disclosure.
FIG. 7 is a block diagram of a flow for dynamically changing a slicing pool associated with a UE and/or one or more applications according to some embodiments of the present disclosure.

FIG. 6 shows flow 600 illustrating an example procedure by which a URSP may be configured for use in dynamically changing slicing pools associated with applications. The functions of flow 600 may, for example, be implemented by slicing reselection manager logic of UE 115 according to aspects of the disclosure. A URSP initially provided to a UE, such as by an operator to which the UE is subscribed, may be augmented to include performance dimension criteria corresponding to various causes for dynamic reselection of PDU sessions through operation according to flow 600.

At block 601 of the illustrated example flow 600, performance dimension information for slicings of an initial URSP configuration are obtained. For example, a UE may obtain performance dimension information from a MVNO administering network slicing within wireless network 100. The performance dimension information may comprise information regarding a capacity or ranking of a plurality of slicings (e.g., each slicing) of a URSP. For example, performance dimension information may comprise capacity or ranking information with respect to performance dimensions for RSDs of the initial URSP configuration. Performance dimension information obtained by the UE may be provided to or otherwise made available to (e.g., stored in memory 282) slicing reselection manager logic executed by the UE.

At block 602 of example flow 600, route selection policy information of the initial URSP configuration is augmented to include performance dimension criteria based on the performance dimension information. For example, slicing reselection manager logic of UE 115 may provide performance dimension criteria for augmenting RSDs (e.g., each RSD) of the initial URSP configuration to include performance dimension criteria. The performance dimension criteria may comprise bandwidth, latency, power consumption, economic performance dimension criteria, etc., such as may correspond to various causes for dynamic reselection of PDU session association with applications. Accordingly, the augmented URSP for switching to a new PDU session association with one or more applications in response to an indication of a cause for dynamic reselection of a current PDU session association with the one or more applications, according to some aspects of the disclosure.

FIG. 7 shows flow 700 illustrating an example procedure by which a UE and/or one or more applications may, in run time, dynamically change a slicing pool associated therewith. The functions of flow 700 may, for example, be implemented by slicing reselection manager logic of UE 115 according to aspects of the disclosure. A current PDU session association with respect to one or more applications may be switched to a new PDU session association based upon one or more causes for dynamic reselection of the PDU session according to flow 700.

At block 701 of the illustrated example flow 700, operation according to a URSP configuration to associate one or more applications to PDU sessions of network slicing operations is performed. For example, slicing reselection manager logic of a UE may cooperate with URSP manager logic of the UE to provide operation according to a URSP initially provided to the UE, such as by an operator to which the UE is subscribed, to associate applications with PDU sessions. According to some aspects of the disclosure, on boot up, a UE may utilize an initial URSP as provided by an operator to associate applications with PDU sessions. In another example, slicing reselection manager logic of a UE may cooperate with URSP manager logic of the UE to provide operation according to a URSP augmented to include performance dimension criteria corresponding to various causes for dynamic reselection of PDU sessions to associate applications with PDU sessions. For example, after augmenting RSDs of an initial URSP to include performance dimension criteria, a UE may utilize the augmented URSP to associate applications with PDU sessions.

At block 702 of the example flow 700 shown in FIG. 7, a message is provided to a URSP manager indicating a cause for dynamic reselection of a current PDU session association with a first application of the one or more applications. For example, slicing reselection manager logic of a UE may provide a message indicating a cause for dynamic reselection of a current PDU session association with one or more applications to URSP manager logic of the UE. Additionally or alternatively, an application for which network slicing is provided may provide a message indicating a cause for dynamic reselection of a current PDU session association with one or more applications to URSP manager logic of the UE. In accordance with some aspects of the disclosure, an indication for a cause for dynamic reselection of a current PDU session association may be provided by the UE, by the one or more applications, etc., such as in association with operational or state changes in the UE and/or applications (e.g., transitioning between low/high power operation, low/high latency operation, low/high throughput operation, low/high economic modes, etc.). The cause for dynamic reselection of the current PDU session association with an application indicated in a message to a URSP manager may correspond to a performance dimension and may indicate a low/high power mode operation, low/high latency mode operation, low/high throughput mode operation, low/high economic mode operation, etc. with respect to the UE and/or one or more applications.

At block 703 of the example flow 700, switching to a new PDU session association with the first application in response to an indication from the URSP manager for reselection of the new PDU session based on the cause for dynamic reselection or keep the current PDU session association with the first application in response to no indication from the URSP manager for reselection of the new PDU session based on the cause for dynamic reselection is performed. For example, slicing reselection manager logic of a UE may cooperate with URSP manager logic of the UE to control reselection of a PDU session association with one or more applications, or not, based on the cause for dynamic reselection. In accordance with some aspects of the disclosure, the URSP manager logic may provide an indication for reselection of the new PDU session based on the URSP manager reevaluating the current PDU session association with the first application with respect to the new PDU session association with the first application in view of the cause for dynamic reselection. The slicing reselection manager logic of aspects may switch from the current PDU session association with the first application to a new PDU session association with the first application, or keep the current PDU session association with the first application, based on whether or not the URSP manager logic provides an indication for reselection of the new PDU session. In accordance with some aspects of the disclosure, the indication from the URSP manager for reselection of the new PDU session may comprise fully matched S-NSSAI for the first application.

Figure 8:
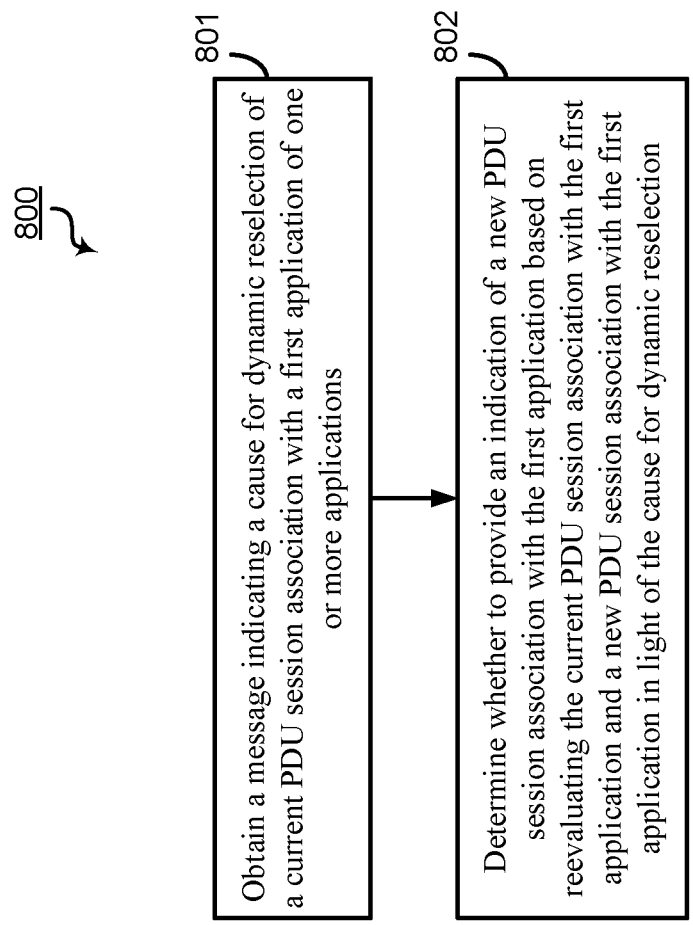
FIG. 8 is a block diagram of a flow for reevaluating current PDU session associations with applications for dynamically changing slicing pools according to some embodiments of the present disclosure.

FIG. 8 shows flow 800 illustrating an example procedure by which a UE reevaluate current PDU session associations with applications for dynamically changing slicing pools. The functions of flow 800 may, for example, be implemented by URSP manager logic of UE 115 according to aspects of the disclosure. A current PDU session association with respect to one or more applications may be switched to a new PDU session association based upon determinations implemented by the URSP manager logic based on one or more causes for dynamic reselection of the PDU session according to flow 800. A current PDU session association with respect to one or more applications may be switched to a new PDU session association using an indication of a new PDU session association with one or more applications provided by the URSP manager logic according to flow 800.

At block 801 of the example flow 800 shown in FIG. 8, a message indicating a cause for dynamic reselection of a current PDU session association with a first application of one or more applications is obtained. For example, URSP manager logic of the UE may obtain a message indicating a cause for dynamic reselection of a current PDU session association with one or more applications from slicing reselection manager logic of a UE. Additionally or alternatively, URSP manager logic of the UE may obtain a message indicating a cause for dynamic reselection of a current PDU session association with one or more applications from an application for which network slicing is provided. The message may, for example, indicate a cause for dynamic reselection of the current PDU session association with an application, such as may indicate low/high power mode operation, low/high latency mode operation, low/high throughput mode operation, low/high economic mode operation, etc. with respect to the UE and/or one or more applications.

At block 802 of the example flow 800, a determination is made regarding whether to provide in indication of a new PDU session association with the first application based on reevaluating the current PDU session association with the first application and a new PDU session association with the first application in light of the cause for dynamic reselection. For example, URSP manager logic of a UE may analyze route selection policy information of a URSP configuration to determine to provide an indication of a new PDU session association with one or more applications based at least in part on the cause for dynamic reselection matching performance dimension criterial of the route selection policy information. The URSP configuration may, for example, comprise an augmented URSP configuration having route selection policy information augmented to include performance dimension criteria corresponding to the cause for dynamic reselection of the current PDU session. In accordance with some aspects of the disclosure, the performance dimension criteria may correspond to bandwidth information, latency information, power consumption information, economy mode information, etc. with respect to slicings of the URSP configuration. An indication from the URSP manager logic for reselection of the new PDU session may thus be based on the URSP manager logic reevaluating the current PDU session association with the first application with respect to the new PDU session association with the first application in view of the cause for dynamic reselection. The indication from the URSP manager for reselection of the new PDU session may comprise fully matched S-NSSAI for the first application.

Figure 9:
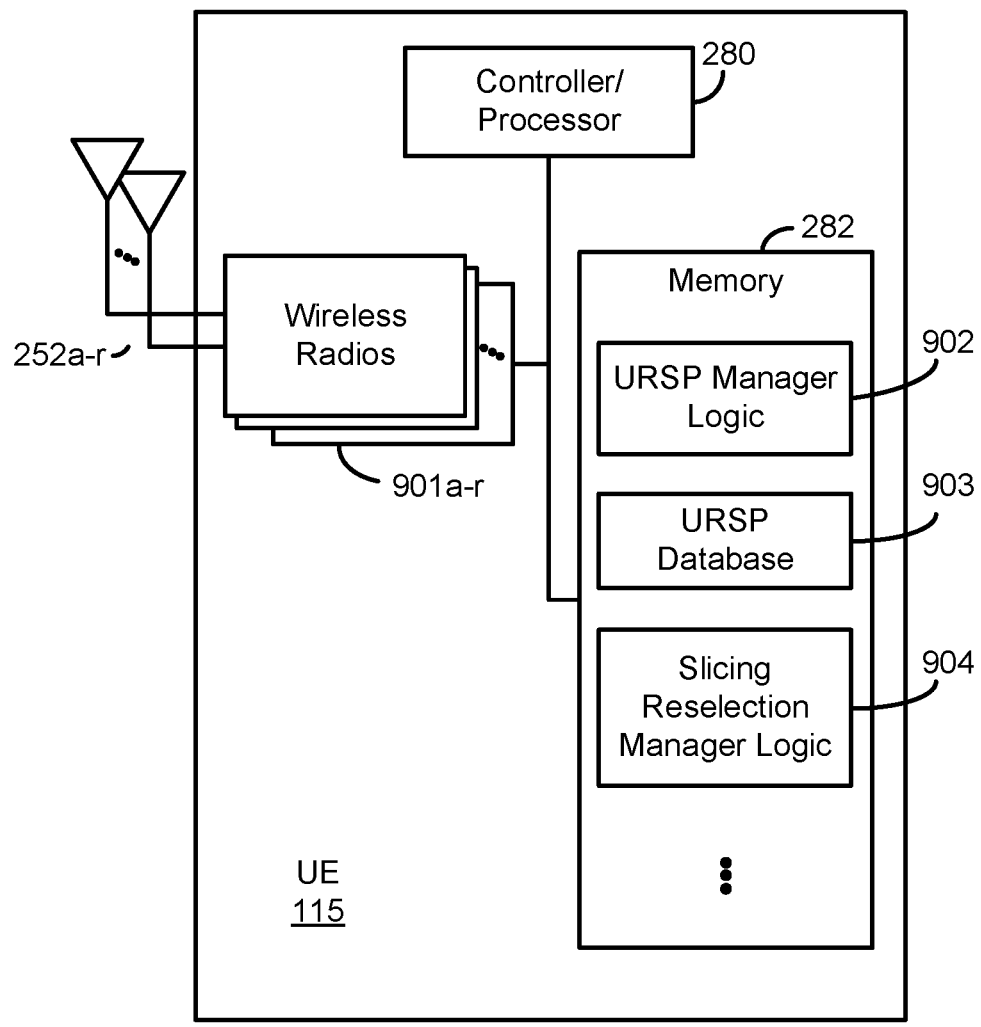
FIG. 9 is a block diagram conceptually illustrating a design of a UE configured for dynamic network slicing resource reselection according to some embodiments of the present disclosure.

FIG. 9 shows a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 901*a-r* and antennas 252*a-r*. Wireless radios 901*a-r* include various components and hardware, as illustrated in FIG. 2 for UE 115, including modulator/demodulators 254*a-r*, MIMO detector 256, receive processor 258, transmit processor 264, and TX MIMO processor 266.

In the example of FIG. 9, UE 115 includes URSP manager logic 902, such as may comprise logic for associating applications to PDU sessions based on a URSP configuration available to the UE, as described above with respect to flow 500 of FIG. 5 and flow 800 of FIG. 8. URSP database 903 may, for example, store one or more URSP configuration instances, such as an initial URSP configuration, an augmented URSP configuration, etc., utilized by URSP manager logic 902. UE 115 in the example of FIG. 9 also includes slicing reselection manager logic 904, such as may comprise logic for augmenting a URSP configuration, dynamically changing a slicing pool associated with a UE and/or one or more applications, etc., as described above with respect to flow 600 of FIG. 6 and flow 700 of FIG. 7.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and modules described herein (e.g., the components, functional blocks, and modules in FIG. 2) may comprise processors, electronics devices, hardware devices, electronics components, logical circuits, memories, software codes, firmware codes, etc., or any combination thereof. In addition, features discussed herein relating to dynamic network slicing resource reselection may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 5-8) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, the apparatus comprising:
    at least one memory comprising instructions; and
    at least one processor configured to execute the instructions to cause the apparatus to:
        operate according to a user equipment (UE) route selection policy (URSP) configuration to associate one or more applications to packet data unit (PDU) sessions of network slicing operation;
        provide a message indicating a cause for dynamic reselection of a current PDU session association with a first application of the one or more applications;
        switch to a new PDU session association with the first application in response to an indication for reselection of the new PDU session based on the cause for dynamic reselection or keeping the current PDU session association with the first application in response to no indication from the URSP manager for reselection of the new PDU session based on the cause for dynamic reselection;
        obtain performance dimension information for slicings of the URSP configuration; and
        augment route selection policy information of the URSP configuration to include performance dimension criteria based on the performance dimension information.

2. The apparatus of claim 1, wherein an indication of the cause for dynamic reselection of the current PDU session association with the first application is provided via by the first application.

3. The apparatus of claim 1, wherein the performance dimension information includes information selected from the group consisting of bandwidth information, latency information, power consumption information, and economy mode information with respect to slicings of the URSP configuration.

4. The apparatus of claim 1, wherein the at least one processor is further configured to cause the apparatus to:
    apply the URSP configuration on boot up of the UE to associate the one or more applications to the PDU sessions; and
    apply an augmented URSP configuration to dynamically reselect PDU session association with the first application after the augmenting the URSP configuration.

5. The apparatus of claim 1, wherein the cause for dynamic reselection of the current PDU session association with the first application indicated in the message corresponds to a performance dimension and is selected from the group consisting of:
    low power mode operation with respect to the first application;
    high power mode operation with respect to the first application;

low latency mode operation with respect to the first application;
high latency mode operation with respect to the first application;
low throughput mode operation with respect to the first application;
high throughput mode operation with respect to the first application;
low economic mode operation with respect to the first application; and
high economic mode operation with respect to the first application.

6. The apparatus of claim 1, wherein the indication for reselection of the new PDU session comprises fully matched single network slice selection assistance information (S-NSSAI) for the first application.

7. The apparatus of claim 1, wherein the indication for reselection of the new PDU session is based on the URSP manager a reevaluation of the current PDU session association with the first application with respect to the new PDU session association with the first application in view of the cause for dynamic reselection.

8. The apparatus of claim 1, further comprising at least one transmitter configured to transmit the message, wherein the apparatus is configured as a UE.

9. An apparatus for wireless communication, the apparatus comprising:
at least one memory comprising instructions; and
at least one processor configured to execute the instructions to cause the apparatus to:
obtain a message indicating a cause for dynamic reselection of a current packet data unit (PDU) session association with a first application of one or more applications; and
provide an indication of a new PDU session association with the first application, wherein a URSP configuration having route selection policy information includes performance dimension criteria corresponding to the cause for dynamic reselection of the current PDU session, and wherein providing the indication of the new PDU session association with the first application is based at least in part on the cause for dynamic reselection matching performance dimension criteria of the route selection policy information.

10. The apparatus of claim 9, wherein an indication of the cause for dynamic resection of the current PDU session association with the first application is provided via the first application.

11. The apparatus of claim 9, wherein the performance dimension criteria corresponds to information selected from the group consisting of bandwidth information, latency information, power consumption information, and economy mode information with respect to slicings of the URSP configuration.

12. The apparatus of claim 9, wherein the cause for dynamic reselection of the current PDU session association with the first application indicated in the message corresponds to the performance dimension criteria and is selected from the group consisting of:
low power mode operation with respect to the first application;
high power mode operation with respect to the first application;
low latency mode operation with respect to the first application;
high latency mode operation with respect to the first application;
low throughput mode operation with respect to the first application;
high throughput mode operation with respect to the first application;
low economic mode operation with respect to the first application; and
high economic mode operation with respect to the first application.

13. The apparatus of claim 9, wherein the indication from the URSP manager for reselection of the new PDU session comprises fully matched single network slice selection assistance information (S-NSSAI) for the first application.

14. The apparatus of claim 9, wherein the at least one processor is further configured to cause the apparatus to:
reevaluating the current PDU session association with the first application with respect to the new PDU session association with the first application in view of the cause for dynamic reselection, wherein the indication of the new PDU session association with the first application is based on the reevaluation.

15. A method for wireless communication comprising:
operating according to a user equipment (UE) route selection policy (URSP) configuration to associate one or more applications to packet data unit (PDU) sessions of network slicing operation;
providing a message indicating a cause for dynamic reselection of a current PDU session association with a first application of the one or more applications;
switching to a new PDU session association with the first application in response to an indication for reselection of the new PDU session based on the cause for dynamic reselection or keeping the current PDU session association with the first application in response to no indication for reselection of the new PDU session based on the cause for dynamic reselection;
obtaining performance dimension information for slicings of the URSP configuration; and
augmenting route selection policy information of the URSP configuration to include performance dimension criteria based on the performance dimension information.

* * * * *